C. A. BROWN.
ALTERNATING CURRENT WATTMETER.
APPLICATION FILED NOV. 27, 1905. RENEWED MAY 25, 1908.
907,568.  Patented Dec. 22, 1908.
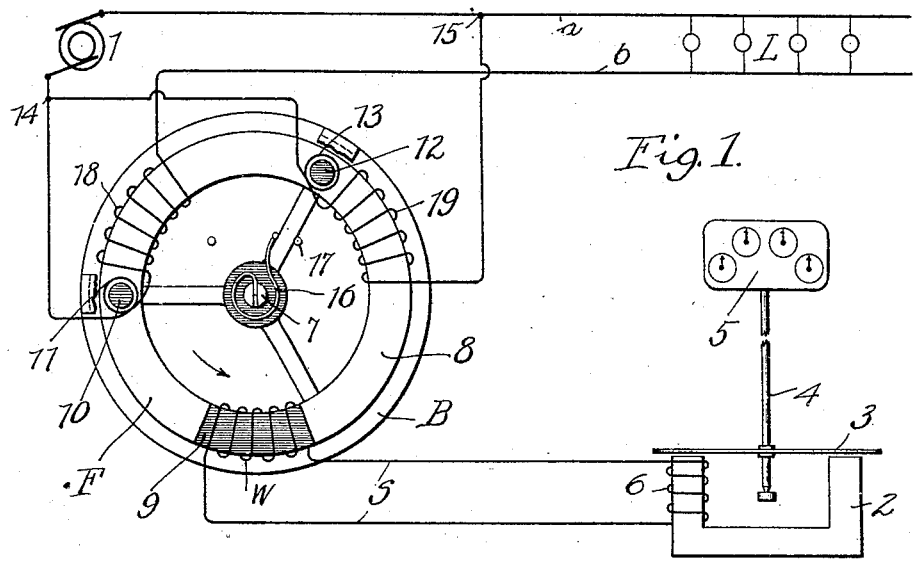
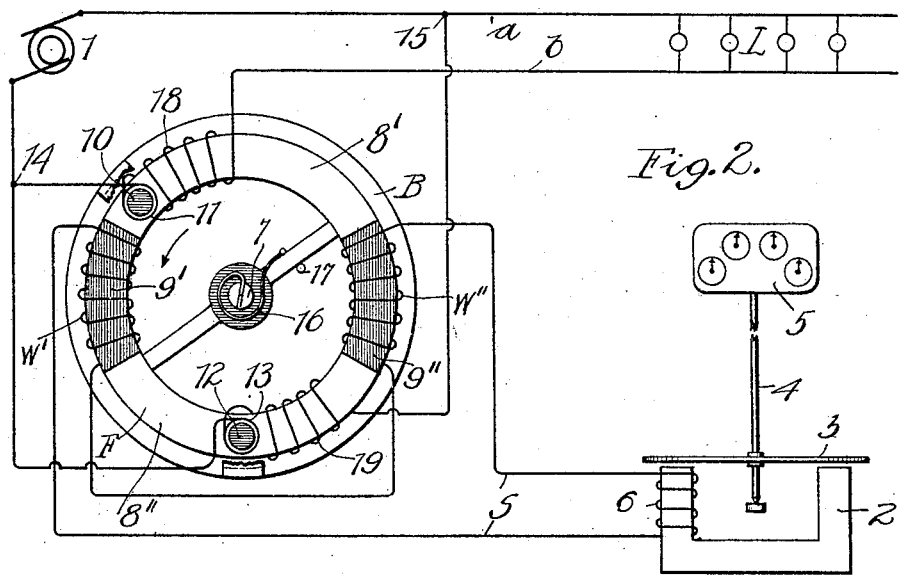
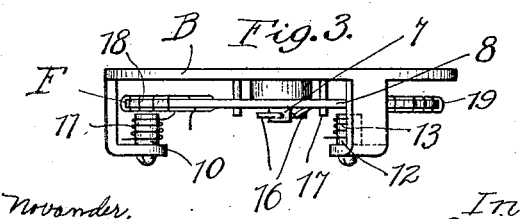
Witnesses:
Leonard W. Novander.
Fred W. Koehn.
Inventor
Charles A. Brown

UNITED STATES PATENT OFFICE.

CHARLES A. BROWN, OF CHICAGO, ILLINOIS.

ALTERNATING-CURRENT WATTMETER.

No. 907,568.     Specification of Letters Patent.     Patented Dec. 22, 1908.

Application filed November 27, 1905, Serial No. 289,197. Renewed May 25, 1908. Serial No. 434,878.

*To all whom it may concern:*

Be it known that I, CHARLES A. BROWN, citizen of the United States, residing at Chicago, in the county of Cook and State of Illinois, have invented a certain new and useful Improvement in Alternating-Current Wattmeters, of which the following is a full, clear, concise, and exact description, reference being had to the accompanying drawings, forming a part of this specification.

My invention relates to alternating current watt meters, and its object is to provide means for producing on a measuring element, by means of a suitable energizing circuit receiving its current by induction, a torque proportional to the watts in the circuit to be measured.

In accordance with my invention a suitable field core is associated with the movable element of the meter and provided with a single energizing coil which will produce a single field to produce rotation of the movable element upon current flow therethrough. This energizing coil is included in an energizing circuit which also includes a winding adapted for inductive association with the main circuit to be measured, and suitable mechanism is provided for establishing such inductive relation between the main circuit and the single energizing circuit that the torque produced on the movable element will be proportional to the watts in the main circuit. The mechanism therefor is so adjusted that normally there will be no current induced into the single energizing circuit but upon current flow through the main circuit the mechanism will be moved to allow induction of current into the energizing circuit, the movement of the mechanism and the amount of induced current being proportional to the main line current and pressure, or, in other words, to the watts in the main circuit.

The mechanism is in the form of a frame in inductive relation with which are a current winding serially included in a limb of the main circuit and a pressure winding bridged across the main circuit limbs, the frame being pivoted and these windings so disposed that current flow through both of them will cause movement of the frame by virtue of the resulting eddy currents set up therein.

This invention may be considered as a modification over the specific form of meter described in my copending application Serial No. 183,632 filed December 3, 1903, in which the torque is also produced by a single energizing circuit. The mechanism in this copending application is in the form of a segment upon which the inductive winding for the single energizing circuit is mounted to be carried thereby into inductive relation with the pressure and current coils associated with the main circuit upon current flow through the main circuit, and this frame may be either of magnetic or non-magnetic material.

My present invention provides for a fixed winding in the single energizing circuit, and the frame is composed of magnetic and non-magnetic sections, only the non-magnetic section being normally associated with the single circuit winding so that there can be no current induced therein upon current flow through current and pressure windings associated with the magnetic section and with the main circuit. Upon current flow through both current and pressure windings and through the main circuit the frame will be moved to carry the magnetic section into inductive relation with the single circuit winding and current will be induced in this winding in proportion to the amount of such magnetic material associated with the winding. The amount of transformer arrangement established between the main circuit and energizing circuit may be easily adjusted to be proportional to the watts in the main circuit and the movable element will therefore rotate in proportion to the main circuit watts.

The exact arrangement in my invention will be best understood by reference to the accompanying more or less diagrammatic drawing, in which—

Figure 1 is a plan view showing one arrangement, and Fig. 2 is a plan view showing a modified arrangement and Fig. 3 is a side view of the frame.

A source 1 of alternating current supplies the translating devices L through the line limbs *a* and *b*. For illustration, a U-shaped magnet core 2 is associated with the meter disk 3 supported on the spindle 4 connected with recording and indicating mechanism 5. A single coil 6 is provided for this core and is included in the single energizing circuit S in series with a winding *w*. To associate the circuit S with the main circuit I provide the frame F which is here shown in the form of a ring pivoted at its center to a shaft or spindle 7 extending from supporting base B. This frame has a magnetic section 8 and a non-magnetic section 9, the non-magnetic section being normally within the winding $w$. A core 10 is provided with a winding 11 included serially in the line limb $b$ and a core 12 is provided with a pressure winding 13 suitably connected across the main line limbs between the points 14 and 15. These cores are supported in suitable manner from the base B and are inductively related to the frame F and on a line displaced from the diameter thereof. Upon current flow through both the windings 11 and 13 a magnetic field will be set up in the frame by the resulting eddy currents and the reaction of this field will cause rotation of the frame depending upon the amount of current flowing through the coil 11. Upon rotation, however, of this frame more or less of the magnetic section thereof will be moved within the winding $w$ and current set up in the single circuit S, which flowing through the coil 6 will cause rotation of the meter movable element 3.

The frame may be held in its normal position in any convenient manner as, for instance, by the use of a spring 16 and stop 17 and in this normal position, as before stated, the winding $w$ will be disposed over the non-magnetic part 9 so that there will be no current flow through the energizing circuit S.

To increase the inductive or transformer effect from the main circuit to the energizing circuit windings 18 and 19 may be provided about the magnetic part of the frame F, the winding 18 being included serially in circuit with the coil 11 and the line limb $b$ and the winding 19 being included serially in the pressure circuit with the coil 13. With this arrangement the main purpose of the electromagnets 10—11 and 12—13 will be to cause rotation of the frame, and the main purpose of the windings 18 and 19 being to induce current flow in the winding $w$ and circuit S, and the relative adjustment between the various windings and electromagnets will be such that the resulting movement of the movable element 3 will be proportional to the watts in the main circuit.

In Fig. 2 as in Fig. 1, the windings and electromagnets are stationary and the frame rotatable, but the single circuit winding is shown in two sections $w'$ and $w''$, serially included in the single circuit S with the meter coil 6. The frame is divided into the magnetic sections 8' and 8'' and the non-magnetic sections 9' and 9''. When there is no current flow through the main circuit the spring 16 holds the frame against the stop 17 in such a position that the winding sections $w'$ and $w''$ are over the non-magnetic sections 9' and 9''. The electromagnet 10—11 and the winding 18 are associated with the magnetic section 8' and the electromagnet 12—13 and the winding 19 are associated with the magnetic section 8''. Upon current flow through the main circuit with this arrangement the frame F will rotate and the magnetic sections 8' and 8'' will be carried within the windings $w'$ and $w''$, and the transformer relation established between the main circuit windings 18 and 19, and the energizing circuit windings $w'$ and $w''$ will be such that the induced current in the circuit S will be proportional to the watts in the main circuit.

The mechanisms and arrangements herein described are merely examples of the many which could be employed to carry out the principles of my invention, and I do not, therefore, wish to be limited thereto, the main feature of my invention being means for establishing inductive or transformer relation between stationary windings associated with a main circuit and with a single meter energizing circuit, so that the current flow through the single energizing circuit will at all times be proportional to the watts through the main circuit.

I claim as new and desire to secure by Letters Patent:

1. In a device of the class described, the combination with a movable element, of a single energizing circuit therefor, a magnetic frame, a secondary winding in said energizing circuit normally out of inductive relation with said magnetic frame, primary circuits in inductive relation with said magnetic frame, said primary circuits being connected with the main circuit to receive current flow therefrom proportional to the pressure and current flow in the main circuit, current flow through the primary circuits causing said frame to be carried into inductive relation with the secondary winding of the single circuit whereby current flow will be induced through the single energizing circuit which is proportional to the watts to be measured.

2. In a device of the class described, the combination with a movable element, of a single energizing circuit therefor including a winding in inductive relation with the element and an extraneous winding, a magnetic frame normally withheld from inductive relation with the extraneous winding, current and pressure circuits connected with the main circuit and in inductive relation with the magnetic frame, current flow through the main circuit causing said magnetic frame to be moved by the action of the series and pressure circuits thereon whereby said magnetic frame is moved to influence the extraneous winding and to cause induction to said winding and the single energizing circuit of current proportional to the watts to be measured.

3. In a device of the class described, the combination with a movable element, of a single energizing circuit therefor, a movable frame having magnetic and non-magnetic sections, series windings and pressure windings connected with the main circuit and associated in inductive relation with the magnetic part of the frame, a winding in the single energizing circuit normally associated only with the non-magnetic section of the frame so that there will be no current flow through the energizing circuit, said pressure and series windings of the main circuit being so disposed with relation to the frame that current flow through the main circuit will cause movement of the frame to carry its magnetic section into inductive relation with the energizing circuit winding whereby a transformer relation is established between the series and pressure windings and said energizing circuit winding, the adjustment being such that the resulting current flow through the single energizing winding will be proportional to the watts to be measured.

4. In a device of the class described, the combination with a movable element, of an energizing circuit therefor, a movable frame having magnetic and non-magnetic sections, a winding in the energizing circuit normally associated with the non-magnetic part of the movable frame, current and pressure circuits connected with the main circuit, a winding in the pressure circuit associated with the magnetic part of the movable frame, a winding in the current circuit also associated with the magnetic part of the movable frame, magnetic means included in the pressure circuit, and magnetic means included in the current circuit, both said magnetic means being associated with the movable member to cause movement thereof upon current flow through the pressure and current circuits whereby the winding in the energizing circuit is brought into association with the magnetic part of the movable member and consequently into inductive relation with the windings in the pressure and current circuits, said windings being so proportioned that the current through the energizing circuit will be proportional to the watts to be measured.

In witness whereof, I hereunto subscribe my name this 25th day of November A. D., 1905.

CHARLES A. BROWN.

Witnesses:
CHARLES J. SCHMIDT,
LEONARD W. NOVANDER.